(12) United States Patent
Schultz

(10) Patent No.: US 7,616,666 B1
(45) Date of Patent: Nov. 10, 2009

(54) METHOD AND SYSTEM FOR CUSTOMIZING UPDATE-STRING PROCESSING IN NETWORK ELEMENTS

(75) Inventor: Donald Allan Schultz, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1103 days.

(21) Appl. No.: 10/314,849

(22) Filed: Dec. 9, 2002

(51) Int. Cl.
*H04J 3/06* (2006.01)
(52) U.S. Cl. .......................... 370/514; 709/220
(58) Field of Classification Search ............... 370/469, 370/471, 473, 514, 254; 709/220–222, 250; 707/10; 717/143; 700/19; 713/1
See application file for complete search history.

(56) References Cited

U.S. PATENT DOCUMENTS

| | | | | |
|---|---|---|---|---|
| 6,230,171 | B1 * | 5/2001 | Pacifici et al. ................ | 715/201 |
| 6,230,194 | B1 * | 5/2001 | Frailong et al. ............. | 709/220 |
| 6,305,606 | B1 * | 10/2001 | Brunelli et al. ........ | 235/462.16 |
| 6,327,591 | B1 * | 12/2001 | Osborn et al. .................. | 707/10 |
| 6,356,951 | B1 * | 3/2002 | Gentry, Jr. .................. | 709/250 |
| 6,397,263 | B1 * | 5/2002 | Hancock et al. ............. | 719/322 |
| 6,404,762 | B1 * | 6/2002 | Luzeski et al. ............. | 370/352 |
| 6,496,858 | B1 * | 12/2002 | Frailong et al. ............. | 709/221 |
| 6,725,376 | B1 * | 4/2004 | Sasmazel et al. ............. | 726/10 |
| 6,954,925 | B1 * | 10/2005 | Kong .......................... | 717/143 |
| 7,151,966 | B1 * | 12/2006 | Baier et al. .................... | 700/19 |
| 7,222,228 | B1 * | 5/2007 | Stephens et al. ............... | 713/1 |
| 7,352,852 | B1 * | 4/2008 | Cocherl et al. ......... | 379/114.02 |
| 2002/0163909 | A1 * | 11/2002 | Sarkinen et al. ............. | 370/386 |
| 2003/0187850 | A1 * | 10/2003 | Reed et al. .................... | 707/10 |
| 2004/0095897 | A1 * | 5/2004 | Vafaei ........................ | 370/254 |
| 2005/0097521 | A1 * | 5/2005 | Liu ............................. | 717/136 |
| 2005/0138132 | A1 * | 6/2005 | Zhou et al. .................... | 709/207 |
| 2005/0172017 | A1 * | 8/2005 | Dawson ........................ | 709/223 |
| 2006/0034319 | A1 * | 2/2006 | Carrel et al. ................ | 370/463 |
| 2006/0101038 | A1 * | 5/2006 | Gabriel et al. ............... | 707/100 |
| 2007/0100793 | A1 * | 5/2007 | Brown et al. .................... | 707/2 |
| 2007/0124467 | A1 * | 5/2007 | Glassco et al. .............. | 709/225 |
| 2007/0220089 | A1 * | 9/2007 | Aegerter ...................... | 709/203 |

OTHER PUBLICATIONS

Solis et al. (FLIP: a flexible protocol for efficient communication between heterogeneous devices; Computers and Communications, 2001. Proceedings. Sixth IEEE Symposium on Jul. 3-5, 2001 pp. 100-106, hereinafter Solis).*

A lightweight protocol for interconnecting heterogeneous devices indynamic environments; KC Almeroth, K Obraczka, D de Lucin—IEEE International Conference on Multimedia Computing 1999.*

Metasystems: An Approach Combining Parallel Processing and Heterogeneous Distributed Computing Systems; AS Grimshaw, JB Weissman, EA West, EC Loyot—Journal of Parallel and Distributed Computing, 1994.*

Multimedia service interworking over heterogeneous networking environments; Sehyeong Cho; Youngmee Shin; Network, IEEE vol. 13, Issue 2, Mar.-Apr. 1999 pp. 61-69.*

* cited by examiner

*Primary Examiner*—Salman Ahmed

(57) ABSTRACT

A method and system for customizing the format and processing of update strings or query requests sent to telecommunications network elements is provided. The method includes receiving formatting instructions along with an update string. The network element is programmed to recognize the format particular to an update string based on processing the formatting instructions. The update string is received and the network element is updated accordingly. The system includes an improved network-element component that has an instruction-processing component for receiving and processing the formatting instructions and returning specifically formatted queries.

18 Claims, 6 Drawing Sheets

314 {
SET POSITION OFF
SET DELIMITER ","
SET MMITEXT OFF
} 316

318

(ADD,Z506,GRPTYP=EANT,PRTNM=SPR7,SELSEQ=MIDL,IDPRTRAN=
EQAC,SNPA=817,ISUPIDX=USP2EAEO,CONNGNPA=817,OPART=2,
RECALLDT=MANUAL,TIMEBIAS=-5,ZEROMPOS=OPR1,BCNAME=3_1KHZ,
TMANIDLV=ALWAYS,ICI=011,TSUSR=17,OPTION=MCCS,OPTION=OHQ,
OPTION=LCDDUR,LCDDUR=12,OPTION=CACPRTNM)

320 {
SET POSITION ON
SET DELIMITER ","
SET MMITEXT ON
} 322

324

(ADD,Z506,2,0,3,2,0,0,15,3,40,10,200,5,27,7,7,817,3,0,817,2,7,-5,3,0,0,3,2
,10,011,0,17,1,1,1,1,1,1,1,1,1,1,1,12,1,0)

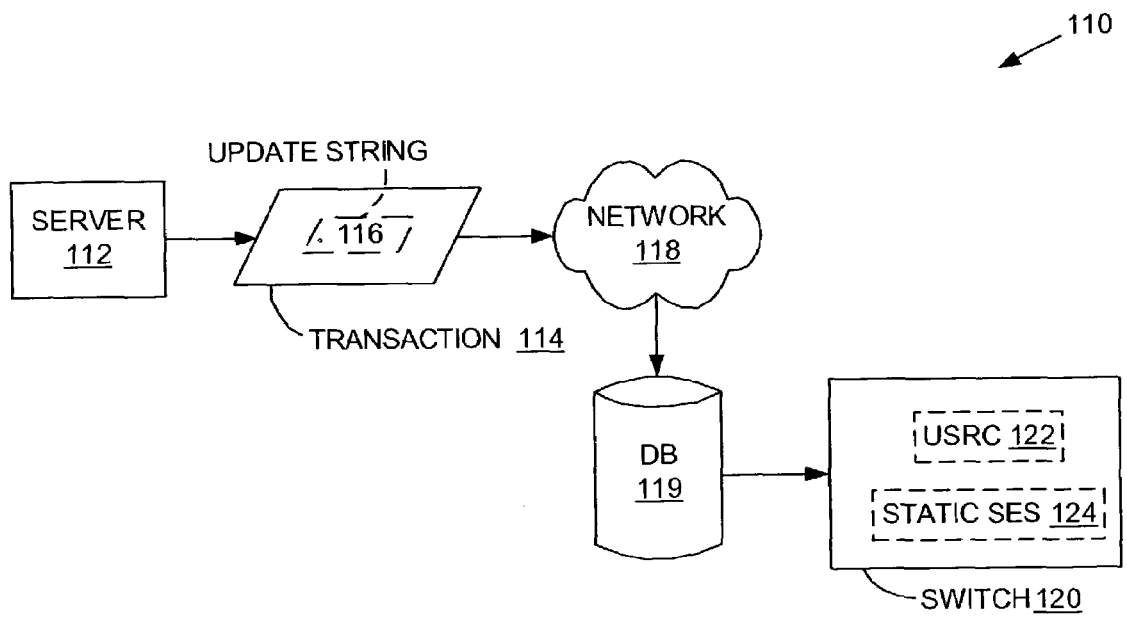
FIG. 1A - Prior Art
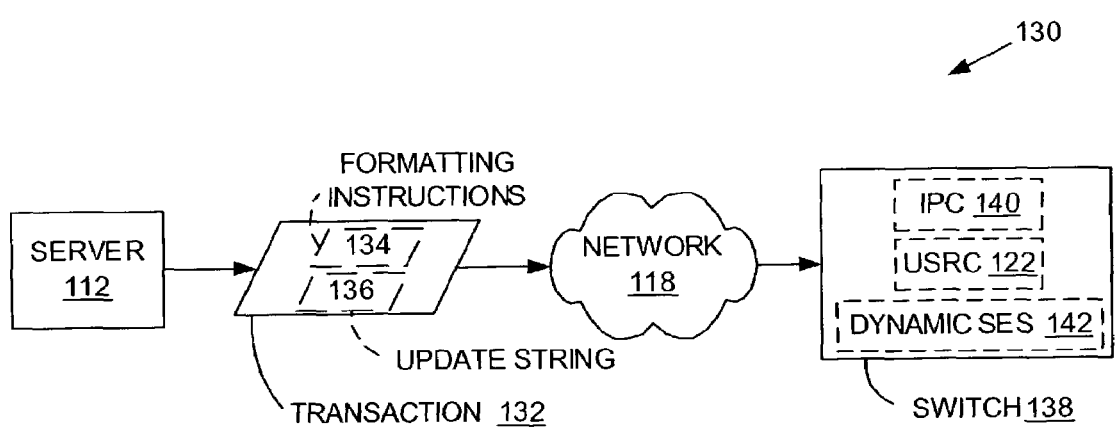
FIG. 1B

| ABBREV. | FIELD NAME | SWITCH DATA |
| --- | --- | --- |
| CLLI | COMMON LANGUAGE LOCATION IDENTIFIER | Z506 |
| GRPTYP | GROUP TYPE | EANT |
| TRAFSNO | TRAFFIC SEPARATION NUMBER | 0 |
| PADGRP | PAD GROUP | FW6 |
| NCCLS | NO CIRCUIT CLASS TYPE | NCOF |
| COS | CLASS OF SERVICE | 0 |
| DIR | DIRECTION | 2W |
| PRTNM | STANDARD PRETRANSLATOR TABLE NAME | SPR7 |
| SELSEQ | SELECT SEQUENCE | MIDL |
| ODSCFLTR | ORIGINATING DISCONNECT FILTER | 40 |
| ORIGFLTR | ORIGINATION FILTER | 10 |
| TDSCFLTR | TERMINATING DISCONNECT FILTER | 200 |
| ANSWFLTR | ANSWER FILTER | 5 |
| IDPRTRAN | ID DIGIT PRETRANSLATOR TABLE NAME | EQAC |
| SNDRPSIG | SENDERIZED PERMANENT SIGNAL | 7 |
| SNDRPDIL | SENDERIZED PARTIAL DIAL | 7 |
| SNPA | SERVING NUMBERING PLAN | 817 |
| ISUPIDX | ISDN USER PART INDEX | USP2EAEO |
| TRAFCLS | TRAFFIC CLASS | NIL |
| CONNGNPA | CONNECTING NPA | 817 |
| OPART | ORIGINATING PARTITION | 2 |
| RECALLDT | RECALL DIALTONE | MANUAL |
| TIMEBIAS | TIMEBIAS | -5 |
| ZEROMPOS | ZERO MINUS POSITION | OPR1 |
| ZONE | ZONE | 0 |
| ADIN | AUTHCODE DATABASE INDEX NUMBER | 0 |
| BCNAME | BEARER CAPABILITY NAME | 3_1KHZ |
| TMANIDLV | TERMINATING ANI DELIVERY | ALWAYS |
| CLIDLEN | CALLING LINE IDENTIFIER LENGTH | 10 |
| ICI | INTERNATIONAL CALL IDENTIFICATION | 011 |
| ANONYMOS | ANONYMOUS | $ |
| TSUSR | TRUNK GROUP SUSPEND/RESUME TIMER | 17 |
| MCCS | MECHANIZED CALLING CARD SERVICE | MCCS |
| OHQ | OFFHOOK QUEUING | OHQ |
| OHQTERM | TERMINATING OFFHOOK QUEUING | OHQTERM |
| ALTTRTMT | ALTERNATE TREATMENTS | ALTTRTMT |
| CASUALU | CASUAL USER | CASUALU |
| ANIDIGS | AUTOMATIC NUMBER IDENTIFICATION | ANIDIGS |
| REORGVAL | REORIGINATION VALIDATION | REORGVAL |
| FWDXMT | FORWARD TRANSMIT | FWDXMT |
| FWDXMT | FORWARD TRANSMIT | ANS |
| CICALLOW | CARRIER IDENTIFICATION CODE ALLOWED | CICALLOW |
| LCDDUR | LONG CALL DISCONNECT DURATION | LCDDUR |
| LCDDUR | LONG CALL DISCONNECT DURATION | 12 |
| CACPRTNM | CARRIER ACCESS CODE PRETRANSLATOR | CACPRTNM |
| $ | NIL (Record termination) | $ |

114 {
(ADD Z506 EANT 0 FW6 NCOF 0 2W SPR7 MIDL 40 10 200 5 EQAC 7 7 817
USP2EAEO NIL 817 2 MANUAL -5 OPR1 0 0 3_1KHZ ALWAYS 10 011 $ 17
MCCS OHQ OHQTERM ALTTRTMT CASUALU ANIDIGS REORGVAL
FWDXMT ANS CICALLOW LCDDUR 12 CACPRTNM $)     ↖116
}

FIG. 3B

302 {
  304 { SET POSITION ON
        SET DELIMITER " "
        SET MMITEXT OFF }

(ADD Z506 EANT 0 FW6 NCOF 0 2W SPR7 MIDL 40 10 200 5 EQAC 7 7 817
USP2EAEO NIL 817 2 MANUAL -5 OPR1 0 0 3_1KHZ ALWAYS 10 011 $ 17
MCCS OHQ OHQTERM ALTTRTMT CASUALU ANIDIGS REORGVAL
FWDXMT ANS CICALLOW LCDDUR 12 CACPRTNM $)     ↖306
}

FIG. 3C

308 {
  310 { SET POSITION OFF
        SET DELIMITER ","
        SET MMITEXT OFF }

312 ↘
(ADD,Z506,GRPTYP=EANT,TRAFSNO=0,PADGRP=FW6,NCCLS=NCOF,
COS=0,DIR=2W,PRTNM=SPR7,SELSEQ=MIDL,ODSCFLTR=40,ORIGFLTR=
10,TDSCFLTR=200,ANSWFLTR=5,IDPRTRAN=EQAC,SNDRPSIG=7,
SNDRPDIL=7,SNPA=817,ISUPIDX=USP2EAEO,TRAFCLS=NIL,
CONNGNPA=817,OPART=2,RECALLDT=MANUAL,TIMEBIAS=-5,
ZEROMPOS=OPR1,ZONE=0,ADIN=0,BCNAME=3_1KHZ,TMANIDLV=
ALWAYS,CLIDLEN=10,ICI=011,ANONYMOS=$,TSUSR=17,OPTION=MCCS,
OPTION=OHQ,OPTION=OHQTERM,OPTION=ALTTRTMT,OPTION=
CASUALU,OPTION=ANIDIGS,OPTION=REORGVAL,OPTION=FWDXMT,
FWDXMT=ANS,OPTION=CICALLOW,OPTION=LCDDUR,LCDDUR=12,
OPTION=CACPRTNM,OPTION=$)
}

FIG. 3D

314 { SET POSITION OFF
SET DELIMITER ","
SET MMITEXT OFF } 316

318 →

(ADD,Z506,GRPTYP=EANT,PRTNM=SPR7,SELSEQ=MIDL,IDPRTRAN=
EQAC,SNPA=817,ISUPIDX=USP2EAEO,CONNGNPA=817,OPART=2,
RECALLDT=MANUAL,TIMEBIAS=-5,ZEROMPOS=OPR1,BCNAME=3_1KHZ,
TMANIDLV=ALWAYS,ICI=011,TSUSR=17,OPTION=MCCS,OPTION=OHQ,
OPTION=LCDDUR,LCDDUR=12,OPTION=CACPRTNM)

FIG. 3E

320 { SET POSITION ON
SET DELIMITER ","
SET MMITEXT ON } 322

324 →

(ADD,Z506,2,0,3,2,0,0,15,3,40,10,200,5,27,7,7,817,3,0,817,2,7,-5,3,0,0,3,2
,10,011,0,17,1,1,1,1,1,1,1,1,1,1,12,1,0)

FIG. 4A

402 { SET POSITION ON
SET DELIMITER " "
SET MMITEXT OFF
SET BEGINNING DELIMITER "#"
SET ENDING DELIMITER "##" } 404

408 →   406 →

REP Z506 EANT 0 FW6 NCOF 0 2W SPR7 LIDL 40 10 200 5 EQAC 7 7 817
USP2EAEO NIL 817 2 MANUAL -5 OPR1 0 0 3_1KHZ ALWAYS 10 011 $ 17
MCCS OHQ OHQTERM ALTTRTMT CASUALU ANIDIGS REORGVAL
FWDXMT ANS CICALLOW LCDDUR 12 CACPRTNM ##

FIG. 4B

410 { SET POSITION OFF
SET DELIMITER ","
SET MMITEXT OFF } 412

(REP,Z506,SELSEQ=LIDL)
      ↖ 414

*FIG. 4C*

416 {
418 {
SET POSITION ON
SET DELIMITER " "
SET MMITEXT OFF
RET Z506
}

420

Z506 EANT 0 FW6 NCOF 0 2W SPR7 MIDL 40 10 200 5 EQAC 7 7 817 USP2EAEO NIL 817 2 MANUAL -5 OPR1 0 0 3_1KHZ ALWAYS 10 011 $ 17 MCCS OHQ OHQTERM ALTTRTMT CASUALU ANIDIGS REORGVAL FWDXMT ANS CICALLOW LCDDUR 12 CACPRTNM
}

*FIG. 4D*

422 {
424 {
SET POSITION OFF
SET DELIMITER ","
SET MMITEXT OFF
RET Z506
}

426

Z506,GRPTYP=EANT,TRAFSNO=0,PADGRP=FW6,NCCLS=NCOF,COS=0, DIR=2W,PRTNM=SPR7,SELSEQ=MIDL,ODSCFLTR=40,ORIGFLTR=10, TDSCFLTR=200,ANSWFLTR=5,IDPRTRAN=EQAC,SNDRPSIG=7, SNDRPDIL=7,SNPA=817,ISUPIDX=USP2EAEO,TRAFCLS=NIL,CONNGNPA =817,OPART=2,RECALLDT=MANUAL,TIMEBIAS=-5,ZEROMPOS=OPR1, ZONE=0,ADIN=0,BCNAME=3_1KHZ,TMANIDLV=ALWAYS,CLIDLEN=10, ICI=011,ANONYMOS=$,TSUSR=17,OPTION=MCCS,OPTION=OHQ,OPTION= OHQTERM,OPTION=ALTTRTMT,OPTION=CASUALU,OPTION=ANIDIGS, OPTION=REORGVAL,OPTION=FWDXMT,FWDXMT=ANS,OPTION= CICALLOW,OPTION=LCDDUR,LCDDUR=12,OPTION=CACPRTNM, OPTION=$
}

*FIG. 4E*

428 {
430 {
SET POSITION OFF
SET DELIMITER " "
SET MMITEXT OFF
RET Z506 SELSEQ GRPTYP
}

Z506 SELSEQ=LIDL GRPTYP=EANT

432

```
         ⎧ SET POSITION OFF
         │ SET DELIMITER ","
         │ SET MMITEXT ON
         │ SET BEGINNING DELIMITER "*"      ⎫
         │ SET FIELDNAME DELIMITER "-"      ⎬ 504
         │ SET ENDING DELIMITER "##"        │
   502 ⎨  SET PRIMARY KEY MARKER "@"       ⎭
         │ SET WRAP 27
         │
         │ QUERY ALL SELSEQ GRPTYP          506
         │ *@Z506@,SELSEQ-2,GRPTYP-3##
         ⎩ *@Z734@,SELSEQ-3,GRPTYP-2##      508
```

*FIG. 5*

METHOD AND SYSTEM FOR CUSTOMIZING UPDATE-STRING PROCESSING IN NETWORK ELEMENTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of telecommunications. More particularly, the present invention provides a new and useful method for simplifying communications with network elements.

BACKGROUND OF THE INVENTION

A telecommunications network has a variety of network elements, such as switches and routers. A telecommunications switch (switch) houses information related to a customer's service. A single switch may service many hundreds of customers and has many data tables within it. These tables contain data used by various network elements to deliver an array of services to customers. As customers change their services, or as other demands may dictate, the various switch tables may need to be updated. A switch is typically updated by receiving a data string. Absent the present invention, assembling this data string is a cumbersome, time-intensive, and expensive process because its format is constrained to a vendor-specified, unmodifiable configuration.

The prior-art method for updating switches, among other updateable network elements, includes receiving a data string at the switch and then processing that data string. A shortcoming of the prior art is that the format of this data string is not modifiable by a customer, such as a communications carrier. An exemplary communications carrier is the Sprint Communications Company L.P. of Overland Park, Kans. (Sprint). The customer is provided no flexibility in assembling the data string nor in configuring how the data string is to be interpreted by the switch.

Confining the switch-update string to a particular format impedes a customer's ability to efficiently update the switch. Some switches require that all fields of a data record must be populated for the update to be processed. One record may contain several hundred fields. Thus, to update a single attribute, a carrier may have to provide a complicated data string having hundreds of fields of which only one corresponds to a desired change. Sending a larger data string requires more time and consumes more bandwidth than sending a smaller string. It would be desirous and useful to have the option to update only desired fields, or even a single field, by communicating an update string that includes only those update commands corresponding to the parameter to be updated.

A customer, such as a carrier, may desire to format the data string and to control its implementation based upon the nature of various switch updates. The update string may take on a variety of forms or have various characteristics. For instance, one method of updating a table is to use a string having data elements interpreted by position. This format is referred to as positional format. Other formats exist, such as name/value-pair format.

Different string formats are optimal in different settings. A string can be optimized to be processed by a machine-to-machine interface (MMI) or a human-to-machine interface. It is also desirable to be able to select a delimiter. A certain field delimiter, such as a comma or a semicolon, may be preferable to another for a certain situation. No switch of the prior art permits these characteristics to be customized.

In contrast, the prior-art uses an inefficient, intermediary database that can be used to format an update string to be received by a switch. Prior-art systems associate a call processing engine with a switch element. Typically, this call processing engine is in the form of a conventional computer, having memory, storage, and processors. The call processing engine holds data in volatile memory, which is more susceptible to data loss than nonvolatile memory. Accordingly, redundant systems are in place to retrieve lost data. The data in memory is updated by an editor program when a transaction is received. A journal file entry is then made, indicating a memory update in the call processing engine. Alternatively, data may be written to a database.

In a telecommunications environment, placing a database before the call processing engine is a relatively inefficient method of implementing switch-update transactions. This inefficient process is used because most database engines have formatting procedures that can format a string to be received by a certain switch. However, processing millions of call processing transactions by first running them through an intermediary database is time consuming and resource intensive.

Merely removing the intermediary database is difficult, however, because doing so may eliminate the update-string formatting offered by the database. Again, prior-art vendors currently constrain the format of update strings to be processed by the call processing engine.

The present state of the art could be enhanced by providing an improved network-element component, a component that processes update-string formatting instructions and interprets data-update strings consistent with those instructions. The art could be further improved to allow direct updating of the call processing engine, whereby transactions are sent in real-time from a carrier application to the element's call processing engine with no intermediate passes through a database.

SUMMARY OF THE INVENTION

The present invention solves at least the above problems by providing a system and method for incorporating text-control settings into network-element control modules such as the Session Management Software (SMS) of a telecommunications switch. The present invention is not constrained by an element's SMS. Providing this functionality increases the efficiency of data-fill activities in a network element regardless of whether the data fill is handled by a machine or human interface.

Moreover, the present invention establishes the commands that are directly processed by a call processing engine. These commands indicate that the corresponding update string will be sent in one of a variety of formats. The switch is able to interpret that data in order to process it without the need of an intermediate database. A router is another example of an engine that the present invention could update directly.

In one aspect of the invention, a method includes communicating one or more update-string-processing (USP) instruction(s) to a network element. The network element is programmed by the update strings to recognize a format of an incoming update string. The update string is processed and changes are made to the network element pursuant to the data elements of the update string.

In another aspect of the invention, an improved network-element component is provided. The network-element component includes an instruction-processing component that receives formatting instructions. The formatting instructions describe the format of an impending update string. After processing the formatting instructions, the network element is programmed to recognize the format of an update or query string.

In another aspect of the invention, the present invention integrates with a customer's automated system to improve data delivery. Automated systems help manage the delivery of large volumes of data to a variety of telecommunications network elements. The present invention satisfies a need for environment control features that support manual, human-to-machine interfaces as well as automated, machine-to-machine interfaces. For example, in a situation where a user synchronizes databases when mirroring switch tables on internal systems, the present invention enables the user to store provisioning data from the switches in native format rather than in a vendor-selected text format. For example, a vendor may specify "pretty" text. But pretty text requires more storage area on the user's systems and requires extensive parsing. The present invention provides a user an option to modify the format of data received, stored, and/or processed by a network element. The user can vary a session environment using a simple set of commands (shown in pseudocode herein). These instructions control how formatted data is interpreted when communicated between a network element and a user's internal, automated systems, such as a machine-to-machine interface (MMI).

Further, in situations where business practices support the initiation of data-fill transactions by a translations analyst (a human-to-machine interface, HMI), using pretty-text format enhances data readability and helps ensure efficient processing. Both MMI and HMI situations are reasonable and valid and are within the scope of the present invention, which allows modification of environment settings among other things.

BRIEF DESCRIPTION OF THE SEVERAL VIEWS OF THE DRAWINGS

The present invention is described in detail below with reference to the attached drawing figures, wherein:

FIG. 1A depicts a prior-art system for processing a relevant switch transaction;

FIG. 1B depicts a suitable operating environment for practicing the present invention;

FIG. 2 is a table of exemplary switch abbreviations, field names, and corresponding switch data;

FIG. 3A depicts an exemplary prior-art transaction consisting of an update string with no formatting instructions; and FIGS. 3B-5 are exemplary transactions received by a network element of the present invention that include formatting and request instructions.

DETAILED DESCRIPTION OF THE INVENTION

The present invention allows a user to dynamically change the way data is interpreted by a network element based on variables that constitute an optimized delivery of that data. Routines or modules are added to a network element, such as a switch, to make certain environment settings variable rather than constant. Additional routines are included to process formatting instructions that program the network element to interpret a variably formatted update string.

ACRONYMS AND SHORTHAND NOTATIONS

Throughout the disclosure of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD-ROM | Compact Disc - Read Only Memory |
| CLLI | Common Language Location Identifier |
| DINA | Distributed Intelligence Network Architecture |
| DVD | Digital Versatile Disks |
| EEPROM | Electrically Erasable Programmable Read-Only Memory |
| HMI | Human-to-Machine Interface |
| HR | Human-Readable |
| LAN | Local Area Network |
| MAN | Metropolitan Area Network |
| MMI | Machine-to-Machine Interface |
| PSTN | Public Switched Telecommunications/Telephone Network |
| RAM | Random Access Memory |
| ROM | Ready-Only Memory |
| SES | Session-Environment Settings |
| SMS | Session Management Software |
| USP | Update-String-Processing |
| WAN | Wide Area Network |

Further, various telecom technical terms are used throughout this disclosure. A definition of such terms can be found in: H. Newton, *Newton's Telecom Dictionary*, 18th Updated and Expanded Edition (2002). These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above cited reference.

As one skilled in the art will appreciate, the present invention may be embodied as, among other things: a method, a data-communications system, or a computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to: RAM, ROM, EEPROM, flash memory or other memory technology, CAROM, digital versatile disks (DVD), holographic media or other optical disk storage, magnetic cassettes, magnetic tape, magnetic disk storage, and other magnetic storage devices.

Communications media typically store computer-useable instructions.

Update-String Processing

FIG. 1A illustrates an exemplary system 110 of the prior art. The prior-art system 110 includes a server 112 that sends a call processing transaction 114, including first update string 116, across network 118 through database 119 to a network element, such as a switch 120, which includes an update-string-receiving component 122 and a set of static session environment settings 124. Server 112 can be any device capable of sending an update command such as a conventional computer. Transaction 114 is not limited to commands that facilitate updating a network element, updating a network-element table, provisioning, routing, destination screening, establishing subscriber features, or modifying subscriber features. Those skilled in the art will appreciate additional commands transaction 114 communicates.

Network 118 could be any network, wired or wireless, capable of communicating transaction 114 to switch 120. Network 118 is shown in a representative capacity. Networks are nebulous, as those skilled in the art will appreciate. The placement of network 118 is not constrained to the illustrations in FIGS. 1A and 1B. It is contemplated within the scope of the present invention that networks couple each element of FIGS. 1A & 1B together. Exemplary suitable networks include switched networks or packet-based networks. The Internet, a LAN, a WAN, a MAN, a PSTN are all types of networks contemplated for use in the present invention. Although switch 120 is provided as an exemplary network element, any updateable network element could benefit from the present invention. Routers, gateways, repeaters, and bridges comprise a nonexhaustive short list of exemplary network elements.

Prior art telecommunications vendors offer proprietary element-management systems that manage transactions on their respective telecommunications switches, such as switch 120. Session-management software is a subset of the element-management software that controls the session environment used to send transaction 114 to the switch. In the prior art, the vendor determines the format of an update string for its session management software and provides only that formatting set to its customers. For example, a vendor may choose to support data fill by field-number position.

In positional formatting, the elements of first update string 116 are read according to their position. An alternative to positional formatting is name/value pair. In name/value-pair formatting, a name is provided with a corresponding value, such as "A=immediate," or "B=seizure." Name/value-pair instructions can be processed independently of their position because each value is associated with a corresponding name.

In prior-art system 110, the vendor also chooses the delimiter that parses the data elements of first update string 116. A delimiter is a symbol or symbols that separates data elements. Exemplary delimiters include a space, a dollar sign, and a comma. As briefly mentioned earlier, the vendor may support either native text (i.e., binary, hex, or other machine-type code) or pretty text (named values such as "yes" or "no") but not both.

An exemplary network-element provider is Nortel Networks of Brampton, Ontario. Nortel uses a space as a delimiter, data fills based on position, and abbreviated pretty text. These selections more clearly support a human-to-machine interface (HMI) and cannot be modified by the customer. The advantage of these choices is that they are easy for a human, such as an analyst, to read and understand when sending transactions to the switch. A disadvantage is that the "machines"—a customer's internal systems, network elements, switches 120, etc., —involved must undertake additional parsing and checking because of the larger volume of data being sent. This extra processing takes time and impacts the overall efficiency of switch 120. The ability to deliver data in a more efficient way is offered by the present invention.

Eliminating or separating session-management software that was bundled with a network element when manufactured is difficult. Without session management software, customer-provisioning activities are difficult to complete at the switch. A switch without session-management software is analogous to a car without a steering wheel. Accordingly, the present invention, among other things, provides a means for increasing the flexibility of network-element software (or firmware) by supporting user-definable data-fill selections and allowing the customer to dynamically determine how best to send data based on business practices and automated systems.

FIG. 1B, illustrates an exemplary system 130 for practicing the present invention. System 130 includes server 112, a second transaction 132, which includes one or more formatting instructions 134 and one or more update string(s) 136, network 118, and a second switch 138, which includes an instruction-processing component 140, update-string-receiving component 122, and one or more dynamic session-environment settings (SES) 142. System 130 is provided for illustrative purposes only. A skilled artisan would understand that many more elements compose a telecommunications network. These conventional elements are left unillustrated for sake of clarity, however noticeable absent from system 130 is intermediary database 119. Accordingly, second transaction 132 can be directly communicated to a network element in real time without passing through a database that formats update string 136.

Second transaction 132 is similar to first transaction 114 but includes formatting instructions 134. Formatting instructions 134 set dynamic session-environment settings 142. As opposed to the prior art, session-environment settings 142 are dynamic, or variable rather than static. Variable session-environment settings 142 represent but one embodiment for programming switch 138 to process the second update string 136. Formatting instructions 134 include commands to program switch 138 to recognize various formats of update string 136, which when executed effect desired changes to the desired network element. The update-string processing instructions, or formatting instruction 134, include instructions for recognizing a format of update string 136. Update string 136 includes a data-update sequence, which includes data elements that update or query a network element.

Update string 136 is customizable using the present invention. That is, the format in which update string 136 is communicated can be set by the user. The switch knows how to interpret the update string 136 based on the formatting instructions 134. Examples illustrating the various formatting options of update string 136 will follow with reference to FIGS. 3A-5, but are briefly discussed here.

As mentioned earlier, a user may wish to customize the format of update string 136 for various reasons. A string in pretty text is longer than a string in machine-type code and would take longer to transfer to the switch. But a string in pretty text is easier for a new analyst to interpret. Other reasons abound for alternative data formats and the present invention enables network element 138 to interpret the variably formatted strings.

Thus, data elements of update string 136 may be interpreted by switch 138 based on their position within the update string. That is, the update string 136 may be in a positional format. The update string 136 may also be formatted using a name/value pair—where each data element was associated with a corresponding data-element name.

Using the present invention, update string 136 can be processed by switch 138 if it was communicated using pretty text. "Human-interpretable" is meant to describe data elements formatted in such a way as to be understood by a skilled artisan. It is possible, over time, for someone to be able to understand the contents of an updated string no matter how obscure it is. But a skilled artisan will at least be able to understand acronyms such as those illustrated in FIG. 2.

The present invention also allows a user to designate a specific delimiter to parse an update string. Formatting instructions 134 will program switch 138 to recognize a user-defined delimiter. The user may choose one or more symbols, such as a dollar sign "$"; a comma ","; a space " "; etc. Rather than making only a vendor-specified delimiter available, the present invention allows a user to choose a delimiter. Similarly, a user could include a command within the formatting instructions 134 to have the switch recognize a beginning or ending of update string 136. For instance, a user could use a pound sign "#" or parentheses "( )" to mark the boundaries of an update string.

Another feature unavailable in the prior art is the ability to designate a primary key. Unable to designate a primary key, users must, absent the present invention, assemble update string 136 pursuant to a prescribed format. But the present invention allows a user to designate a data element within update string 136 as a primary key. Thus, a user is not constrained to use only a specified location or formation designating a primary key of a database.

FIG. 2 provides a table of illustrative acronyms and corresponding switch data values and field names used herein to illustrate a portion of the various embodiments of the present invention. For instance, "CLLI" means "common language location identifier." Various examples using these abbreviations and names are provided.

FIG. 3A illustrates a transaction to be processed by a switch consistent with the prior art. Transaction 114 includes only an update string 116 but no formatting instructions. This is typical of the prior art because the witch that receives transaction 114 is unmodifably programmed to receive a data string formatted in one particular way. The update string 116 includes many data elements. The specific update string 116 shown adds a record to a table, indicated by the "ADD" prefix. Update string 116 is in "positional" format, where the position of each element corresponds to a data value. The delimiter is a space.

The present invention allows a transaction such as transaction 302 of FIG. 3B to be processed by switch 138. In one embodiment, an improved switch, such as switch 138, is provided that allows transactions with formatting instructions to be processed.

Transaction 302 and the remaining transactions provided in FIGS. 3B-5 could be representations of transaction 132 of FIG. 1B. Per FIG. 3B, transaction 302 includes formatting instructions 304 and update string 306. The addition of formatting instructions 304 coupled with an improved switch that can process the instructions to recognize the format particular to update string 306 increase the usefulness of the present invention. The formatting instructions 304 are represented in pseudocode, which defines one or more functions. The pseudocode can be any data-string instruction that implements the functions described in the present invention. Formatting instructions, such as "SET POSITION," "SET DELIMITER," and "SET MMITEXT" can assume a variety of formats themselves. For example "SET POSITION" could be programmed as "SETP" to set positional data rather than name/value-pair data on. The functionality of the illustrative pseudocode is within the scope of the present invention. A skilled programmer would understand that the actual coding of formatting instructions 304 (as well as all other formatting instructions) could be done in a variety of computer languages not limited to C, C++, Java, COBOL, Visual Basic, Unix, assembly language, FORTRAN, etc.

Formatting instructions 304 in FIG. 3B turn field-number position on, set the field delimiter to a blank space, and turn off machine-to-machine text. Update string 306 is easy for a human to read but is long and difficult to parse. "Z506" is the primary key of the record and the remaining data elements define part of a trunk-group service In FIG. 3C, a transaction 308 includes formatting instructions 310 and update string 312. Update string 312 is another "ADD" command. Here, name/value pairs are used, as indicated by "position" set to "off." The field delimiter is a comma. Machine-to-machine text is turned off, indicating that the update string 312 uses a form of human-interpretable text. Although update string 312 of FIG. 3C is formatted differently than update string 306 of FIG. 3B, switch 138 will be able to interpret update string 312 because it will process formatting instructions 310. Formatting instructions 310 will program switch 138 to recognize the format particular to update string 312. The order of the data elements in update string 312 is irrelevant since the field names are provided with corresponding data values. This format is easy for a human to read but results in a large number of bytes to be received and parsed at the network element, which in this case is switch 138.

FIG. 3D illustrates another transaction 314, a group of formatting instructions 316, and a data-update string 318. Although having the same formatting instructions of FIG. 3C, transaction 314 illustrates that the present invention allows customized update strings, such as update string 318 to be processed. Some switch vendors have default values for some of their fields. Update string 318 illustrates that, using the present invention, only the required fields that make a certain trunk-group service unique need to be supplied.

FIG. 3E illustrates another transaction 320, a group of formatting instructions 322, and a data update string 324. Formatting instructions 322 set field number position "on," set the field delimiter to a comma, and turn the machine-to-machine text on. MMI text is more quickly transferred and processed by a receiving component. Thus, switch 138 will be programmed to process update string 324 in positional format with data elements separated by commas in MMI text. Update string 324 illustrates that the present invention can make use of MMI text to increase data-rate transfer but still effect the desired changes. For example, the third element in update string 324 is "2," which may correspond to a part of a trunk group type of "EANT." Using this scheme, various trunk-group types could be designated by varying the numeric value of the third data element. For example, a setting of "3" may correspond to a trunk group type of "ONAT." This method is the preferred method for adding parts of trunk groups for an MMI (Machine-to Machine-Interface). The example provided for designating various trunk-group types by varying the value of the respective data element in update string 324 is applicable to the various other elements in update string 324. Those too can be varied to cause a different network-element configuration. Although FIG. 2 provides an exemplary list of configurable field names, those skilled in the art will appreciate that hundreds of other fields would be configurable using the present invention.

Continuing to provide more illustrative actions enabled by the present invention, FIGS. 4A-4C depict various formats for changing a part of a trunk group.

FIG. 4A illustrates another transaction 402, a group of formatting instructions 404, and a data-update string 406. Formatting instructions 404 set field number position "on," set the field delimiter to a space, and turn the machine-to-machine text off. Thus, switch 138 will be programmed to process update string 406 in positional format with data elements separated by spaces in more human-interpretable text. Update string 406 also illustrates how a pound sign "#" is used to mark the beginning of an update string and a double pound sign "##" is used to designate an ending of the same. An exemplary scenario applicable to transaction 402 may be to update data element 408 ("Select Sequence") to a value of "LIDL" when no other data values need to be changed. Sending all the elements of update string 406 to the switch is an inefficient use of resources, although it may be desired in certain circumstances. The switch 138 will overwrite all of the previous values with the new data. A better method for reaching the same result is illustrated in FIG. 4B using the present invention.

FIG. 4B illustrates another transaction 410, a group of formatting instructions 412, and an update string 414. Formatting instructions 412 set field number position "off," set the field delimiter to a comma, and turn the machine-to-machine text off. Thus, switch 138 will be programmed to process update string 414 in name/value-pair format with data elements separated by commas in human-interpretable text. The present invention allows transaction 410 to cause the same result reached by processing transaction 402, but more efficiently. Transaction 410 is composed of less data than transaction 402. Hence, transaction 410 can be sent in less time and processed more quickly. Moreover, because formatting instructions 412 will program switch 138 to recognize the name/value-pair format of update string 414, only the data element associated with modifying the "Select Sequence" data value need be sent. The inefficient process of overwriting non changing values is replaced with an efficient process of updating only the value(s) desired. Recall that some prior-art network elements require hundreds of values to be provided even if only one value is to be updated. The present invention improves this art by providing an improved switch that can selectively update a subset of all possible updateable values. Additionally, errors attributable to human keying are reduced by not having to provide all values. Turning MMI text on would allow communication of an even shorter update string, such as "REP,Z506,SELSEQ=2" where "2" corresponds to a select sequence of "LIDL."

FIGS. 4A-4C depict illustrative examples for querying a record.

FIG. 4C illustrates how the present invention enables a query of an illustrative record "Z506" to be returned in a specific format. Transaction 416 includes a group of formatting instructions 418 and a query string 420. As used herein, a query string is one type of update string. Formatting instructions 418 set field number position "on," set the field delimiter to a space, and turn the machine-to-machine text off. Also included in formatting instructions 418 is a line that requests a query of record "Z506": "RET Z506." As with the other instructions, "RET Z506" represents a command in pseudocode only. Thus, switch 138 will be programmed to return query string 420 in a particular format consistent with formatting instructions 418. Query string 420 is, however, in a format difficult for a human to relate the field values to a field name. For example, say that an analyst needs to interpret query string 420. This will be difficult because he or she must count to the 21st field and refer to the vendor's documentation in order to determine that the "2" corresponds to a data field of "OPART," for example. If the analyst is unable to modify the format of query string 420, then such cumbersome interpretation must be endured. The present invention would permit the query string to be more easily interpreted by customizing its format.

As illustrated in FIG. 4D, the same data returned from query string 420 is returned in a human-interpretable format using query string 426 in transaction 422 with formatting instructions 424. The element "OPART=2" and all other labels saves an analyst time because of their descriptive nature.

A still more efficient method of obtaining status information is to query on specified items of choice. The present invention allows a user to query on a single item or on multiple items. As illustrated in FIG. 4E, transaction 428 includes formatting instructions 430 that request the status of two settings: "SELSEQ" and "GRPTYP." As indicated by query string 432, only the data requested is returned. The data is in pretty-text format because MMI text is set to "off." The pretty text combined with the limited data returned make query string 432 easy to interpret. The select sequence is "LIDL" and group type is "EANT." An analyst could have queried on "SELSEQ" only or any other attribute individually. Also, MMI text could be turned on to return "Z506 SELSE=2 GRPTYP=3."

In the preceding examples, pseudocode was provided to illustrate the function of the various formatting instructions. As previously mentioned, additional formatting instructions could be included and are contemplated within the scope of the present invention. For example, recognizing string-beginning makers, recognizing string-terminating markers, selecting a field-name delimiter, designating a primary key, and allowing for the data wrapping are but a few examples of additional formatting functions. These additional exemplary functions are illustrated in FIG. 5 by transaction 502, which includes formatting instructions 504, first query string 506 and second query string 508.

It can be seen from FIG. 5 that an asterisk "*" marks the beginning of each query string 506 and 508. The at symbol "@" marks "Z506" as the primary key to query on for query string 506 and "Z734" for query string 508. Setting a primary key marker allows the client to know how many fields make up the primary key of the record without having to refer to documentation. A dash "-" is used as a field delimiter to make for easy parsing of "SELSEQ-2" and "GRPTYP-3" in query string 506 for example. The end of each query string is easily denoted by two pound symbols "##" as set forth in formatting instructions 504 and implemented in query strings 506 and 508. The "SET WRAP" instruction will limit lines to a certain number of characters, such as to twenty-seven (27) for example. Those skilled in the art will appreciate additional formatting instructions applicable to the present invention.

Similarly, functions beyond querying, updating, deleting and adding data to network elements are also contemplated within the scope of the present invention. A nonexhaustive list of additional exemplary functions contemplated within the scope of the present invention include: displaying active users; processing commands in batch; and retrieving record counts.

As can be seen, the present invention and its equivalents are well-adapted to provide a new and useful method for efficiently configuring network element devices. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. In a telecommunications networking environment including a server and one or more dynamic session-environment setting(s), a method of processing a dynamically user-customizable network-element-update string (dynamically user-customizable update string) of a particular format, comprising:
   receiving one or more update-string-processing (USP) instruction(s),
      (1) wherein the one or more dynamic session-environment setting(s) are set based on the USP instructions without the aid of a database and a network element is programmed to recognize the format particular to a dynamically user-customizable update string associated with the USP instruction(s),
      (2) wherein the one or more USP instructions include instructions that cause said network element to perform a recognizing process to recognize a format of a corresponding data string,
      (3) wherein said recognizing process includes,
         a) interpreting the dynamically user-customizable update string when communicated using human-interpretable text,
         b) interpreting the dynamically user-customizable update string when communicated in machine-readable text, and
         c) recognizing one or more elements of the dynamically user-customizable update string as a primary-key;
   receiving the dynamically user-customizable update string without the aid of a database; and
   effecting changes to the network element consistent with the received dynamically user-customizable update string.

2. The method of claim 1, wherein the dynamically user-customizable update string is comprised of at least one data element.

3. The method of claim 2, wherein recognizing a format of a corresponding data string further includes one or more of the following:
   interpreting the data elements of the dynamically user-customizable update string based on position;
   interpreting the data elements of the dynamically user-customizable update string based on an associated data-element name;
   interpreting the dynamically user-customizable update string parsed with a specified field delimiter;
   recognizing a data wrapping-value; and
   recognizing a beginning and/or ending marker of the dynamically user-customizable update string.

4. The method of claim 3, wherein effecting changes to the network element comprises effecting one or more of the following operations:
   updating a network-element table;
   provisioning;
   routing;
   destination screening;
   establishing subscriber features; and
   modifying subscriber features.

5. The method of claim 4, wherein modifying a network-element table comprises one or more of the following:
   adding a record to said table;
   modifying a record of said table;
   deleting a record from said table; and
   querying a record from said table.

6. The method of claim 4, wherein provisioning comprises one or more of the following:
   provisioning a trunk; and
   provisioning a circuit.

7. The method of claim 4, wherein routing comprises one or more of the following:
   basic routing;
   featured routing; and
   Distributed Intelligence Network Architecture (DINA) Class 1 routing.

8. A computer-readable medium having computer-executable instructions embodied thereon that cause a network element to perform a method of processing a transaction, wherein said transaction comprises one or more formatting instructions and a dynamically user-customizable network-element-update string (dynamically user-customizable update string) of a particular format, the method comprising the steps of:
   processing said one or more formatting instructions, including instructions to set one or more dynamic session-environment setting(s), without the aid of a database, wherein processing said one or more formatting instructions includes programming said network element to recognize a string format particular to the dynamically user-customizable update string including
      (1) interpreting the dynamically user-customizable update string when communicated using human-interpretable text,
      (2) interpreting the dynamically user-customizable update string when communicated in machine-readable text, and
      (3) recognizing one or more elements of the dynamically user-customizable update string as a primary-key;
   receiving the dynamically user-customizable update string without the aid of a database; and
   effecting changes to the network element consistent with the received dynamically user-customizable update string.

9. The computer-readable medium of claim 8, wherein said transaction accomplishes one or more of the following tasks:
   updating the network-element;
   provisioning;
   routing;
   destination screening;
   establishing subscriber features; and
   modifying subscriber features.

10. The computer-readable medium of claim 8, wherein said dynamically user-customizable update string comprises one or more data elements.

11. The computer-readable medium of claim 10, wherein programming said network element includes one or more of the following:

interpreting the data elements of the dynamically user-customizable update string based on position;

interpreting the data elements of the dynamically user-customizable update string based on an associated data-element name;

interpreting the dynamically user-customizable update string parsed with a specified field delimiter; and recognizing a beginning and/or ending delimiter of the dynamically user-customizable update string.

12. An improved network-element component, comprising an instruction-processing component that processes one or more formatting instructions to set one or more dynamic session-environment setting(s) without the aid of a database, wherein incident to executing said formatting instructions, a network element is programmed to recognize a format of a dynamically user-customizable update string associated with said one or more formatting instructions, wherein processing said one or more formatting instructions includes programming said network element to recognize a string format particular to the dynamically user-customizable update string including (1) interpreting the dynamically user-customizable update string when communicated using human-interpretable text, (2) interpreting the dynamically user-customizable update string when communicated in machine-readable text, and (3) recognizing one or more elements of the dynamically user-customizable update string as a primary-key.

13. An improved telecommunications switch that processes a dynamically user-customizable network-element-update string (dynamically user-customizable update string) of a particular format, comprising:

an instruction-receiving means that receives one or more formatting instructions, (1) wherein the one or more formatting instructions include instructions that set one or more dynamic session-environment setting(s) without the aid of a database, (2) wherein said one or more formatting instructions includes instructions that program said switch to recognize a format particular to the dynamically user-customizable update string incident to processing said formatting instructions, and (3) wherein the instructions that program said switch include instructions that facilitate a) interpreting the dynamically user-customizable update string when communicated using human-interpretable text, b) interpreting the dynamically user-customizable update string communicated in machine-readable text, and c) recognizing one or more elements of the dynamically user-customizable update string as a primary-key;

a data-receiving means that receives the dynamically user-customizable update string without the aid of a database; and an updating means that effects changes to said switch consistent with the received dynamically user-customizable update string.

14. The switch of claim 13, wherein the instructions that to program said switch include instructions that facilitate one or more of the following tasks:

interpreting a positionally formatted dynamically user-customizable update string;

interpreting name/value-pair dynamically user-customizable update string;

interpreting the dynamically user-customizable update string parsed with a specified field delimiter; and recognizing a beginning and/or ending delimiter of the dynamically user-customizable update string.

15. An improved method for updating a switch, comprising:

sending to the switch one or more formatting instructions that describe(s) a dynamically user-customizable format that said switch uses to process a switch command and set(s) one or more dynamic session-environment setting (s), without the aid of a database, wherein processing said switch command includes interpreting said switch command when communicated using human-interpretable text, interpreting said switch command when communicated in machine-readable text, and recognizing one or more elements of said switch command as a primary-key; and sending said switch command in a format consistent with the formatting instructions sent to the switch, wherein said switch interprets said switch command consistent with said formatting instructions.

16. The method of claim 15, wherein said switch command includes a dynamically user-customizable update sequence or query string.

17. The method of claim 16, further comprising receiving a query result incident to interpreting said query string, wherein said query result is communicated from said switch in a dynamically user-customizable format consistent with said formatting instructions.

18. A system that processes an update transaction in a telecommunications network environment, comprising:

a transaction-transmission component;

a server coupled to the transaction-transmission component;

one or more dynamic session-environment setting(s); and a network element coupled to said server and said transaction-transmission component free of an intermediary database disposed between said transaction-transmission component and said network element, (1) wherein said network element comprises an instruction-processing component that processes one or more formatting instructions to set the one or more dynamic session-environment setting(s) without the aid of a database, (2) wherein incident to executing said formatting instructions, said network element is programmed to recognize a format of a dynamically user-customizable update string associated with said one or more formatting instructions, (3) wherein processing said one or more formatting instructions includes programming said network element to recognize a string format particular to the dynamically user-customizable update string including a) interpreting the dynamically user-customizable update string when communicated using human-interpretable text, b) interpreting the dynamically user-customizable update string when communicated in machine-readable text, and c) recognizing one or more elements of the dynamically user-customizable update string as a primary-key.

* * * * *

UNITED STATES PATENT AND TRADEMARK OFFICE
CERTIFICATE OF CORRECTION

| | | |
|---|---|---|
| PATENT NO. | : 7,616,666 B1 | Page 1 of 1 |
| APPLICATION NO. | : 10/314849 | |
| DATED | : November 10, 2009 | |
| INVENTOR(S) | : Donald Allan Schultz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1307 days.

Signed and Sealed this

Nineteenth Day of October, 2010

David J. Kappos
*Director of the United States Patent and Trademark Office*